United States Patent [19]

Herrington et al.

[11] 4,069,292

[45] Jan. 17, 1978

[54] PRESSURE CONTROL IN TUBULAR THERMOPLASTIC EXTRUSION

[75] Inventors: F. John Herrington, Holcomb; Gordon P. Hungerford, Palmyra, both of N.Y.

[73] Assignee: Mobil Oil Corporation, New York, N.Y.

[21] Appl. No.: 623,235

[22] Filed: Oct. 17, 1975

Related U.S. Application Data

[63] Continuation-in-part of Ser. No. 501,118, Aug. 28, 1974, abandoned.

[51] Int. Cl.² ..................... B29D 7/22; B29D 23/04
[52] U.S. Cl. ........................... 264/40.3; 137/224; 137/487.5; 264/95; 264/210 R; 425/72 R; 425/140; 425/149; 425/326.1
[58] Field of Search ............... 264/40, 89, 90, 210 R, 264/209, 290 R, 40.3, 95; 425/72, 140, 326 R, 149, 387 R; 137/209, 226, 224, 487.5

[56] References Cited

U.S. PATENT DOCUMENTS

| 1,934,571 | 11/1933 | Sutton | 137/224 |
|---|---|---|---|
| 2,940,126 | 6/1960 | Sheridan | 264/40 |
| 3,170,011 | 2/1965 | Cheney et al. | 425/326 R |
| 3,478,391 | 11/1969 | Roome | 425/72 |
| 3,516,429 | 6/1970 | Sandstede et al. | 137/487.5 |
| 3,551,540 | 12/1970 | Pellicciari et al. | 264/210 R |
| 3,700,370 | 10/1972 | Hearns et al. | 425/326 R |
| 3,821,339 | 6/1974 | Johnson | 264/40 |

FOREIGN PATENT DOCUMENTS

| 917,033 | 8/1954 | Germany | 264/40 |
|---|---|---|---|
| 1,087,720 | 10/1967 | United Kingdom | 264/95 |

*Primary Examiner*—Jeffery R. Thurlow
*Attorney, Agent, or Firm*—Charles A. Huggett; James D. Tierney

[57] ABSTRACT

A method for continuously controlling the internal bubble pressure in a tubular thermoplastic film extrusion process which comprises a pressure sensor device which feeds a signal to a pressure controller. In response to the signal the pressure controller feeds a proportional signal to an air valve member which, dependent upon the signal, either increases or decreases air flow into the bubble. A poppet valve, in direct communication with the air pressure inside the bubble, opens to rapidly exhaust air to the atmosphere when the pressure inside the bubble exceeds a set maximum.

1 Claim, 2 Drawing Figures

PRESSURE CONTROL IN TUBULAR THERMOPLASTIC EXTRUSION

CROSS-REFERENCE TO RELATED APPLICATIONS

The present application is a continuation-in-part of U.S. application Ser. No. 501,118 filed Aug. 28, 1974, now abandoned.

BACKGROUND OF THE INVENTION

1. Field of the Invention

The present invention relates to a method for preparing continuous, seamless blown thermoplastic film tubing by melt extruding a thermoplastic resin. In particular, it relates to apparatus and method for controlling the air pressure in the extruded film bubble as it advances from the die to a pair of collapsing nip rollers.

2. Description of the Prior Art

It is well known in the plastic art to continuously melt extrude thermoplastics through an annular orifice, apply internal fluid pressure to the extruded tube to support and expand the tube and reduce the wall thickness thereof to appropriate dimensions while cooling and solidifying the extruded thermoplastic. Collapsing pinch rollers, which draw the transversely expanded bubble in the longitudinal or machine direction, also served to flatten the formed tube into a double thickness. The flattened tube may be wound into a cylindrical roll for storage and subsequent use as a tube, or the tubing may be slit to form a single thickness sheet of double width wound into one roll, or two single thickness sheets wound into two separate rolls.

The fluid under pressure, usually air, which is used to inflate the extruded tubing is generally forced into the tubular film through an orifice within the tubular film (e.g. from the central mandrel portion of the die) under a substantially constant pressure which is sufficient to effect a desired radial expansion, and thus molecular orientation, of the successive portions of the tubular film after they leave the die and while they are being externally cooled to an orientation temperature exteriorly of the die. This external cooling of the extruded tube may be effected utilizing conventional cooling rings, mounted coaxially around the outer circumference of the tube. The rings supply cool air, under pressure, which impinges upon the surface of the advancing, inflated tube. Alternative techniques for imposing a desired shape on an extruded deformable thermoplastic tube are known in the prior art. For example, U.S. Pat. No. 3,551,540, the disclosure of which is incorporated herein by reference, discloses a method and apparatus for shape imposition. Finally, the tubing is collapsed by being passed through a pair of nip rollers. The bubble of air, under pressure, within the film tube may be thought of as an internal, orientation mandrel whereby film is being continuously expanded and drawn over the air-mandrel by the driven nip rollers which collapse the tube.

In a conventional tubular extrusion process, the air within the bubble is controlled in volume as necessary to establish the required bubble diameter, and the pressure is normally not controlled in any way. However, in a process in which the shape of the bubble is imposed by an external means, the bubble diameter and thus the volume of internal air is established by the shaping device, and it is necessary to carefully control the pressure of the air within the bubble, in order to maintain the extruded tubing in proximity to the shaping device, as well as to keep the bubble rigid while it is being collapsed.

As hereinbefore noted, during the tubular extrusion operation the air pressure within the extruded bubble remains relatively constant. Accordingly, if the bubble diameter becomes larger such as during start-up, for example, or due to a process change, the volumetric capacity of the bubble becomes larger, and in order to maintain the required pressure it is necessary to add air to the inside of the bubble. Conversely, if the diameter of the bubble becomes smaller, for example during shut-down operations or due to a process change, it is necessary to remove air from the bubble or allow it to escape to the atmosphere.

SUMMARY OF THE INVENTION

The present invention comprises a method for the continuous regulation of the air pressure within the confines of the thermoplastic bubble product in the imposed shape blown tubular extrusion process for the production of thermoplastic films. The pressure regulation systems comprise a signal tube which senses the air pressure within the bubble and feeds a signal to a pressure controller unit. The controller unit monitors the signal and if the signal is below a predetermined set point, the control unit sends a proportional amount of air pressure to a diaphragm valve. The diaphragm valve opens an air pressure line which sends air under pressure directly into the thermoplastic bubble being extruded until the air pressure within the bubble corresponds to the desired set point whereupon the signal tube-feeds this information back to the pressure controller which subsequently closes or adjusts the diaphragm valve accordingly. When the air pressure in the extruded bubble is just slightly above that which is desired, a poppet valve equipped with a bleed port, attached to the main air feed line to the bubble, will allow air to exhaust to the atmosphere at a low rate through the bleed port of the poppet valve. Likewise, a sudden surge of pressure within the bubble, well above that which is desired, will be rapidly exhausted before the tube ruptures through the poppet valve itself. The poppet valve and bleed port thus satisfies the exhaust requirements, of a slow exhaust rate during normal operations and a rapid exhaust when required during shut-down operations or unusual process conditions, for example.

DESCRIPTION OF SPECIFIC EMBODIMENTS

In the extrusion of tubular films a proportional pressure controller senses the bubble internal pressure, and actuates one or more valves to add or exhaust air at a rate proportional to the difference between the actual and desired pressure. In a conventional system, one valve would be located between the bubble and a compressed air source, and would open when actual pressure is below set point, adding compressed air. A second valve would be located between the bubble and the atmosphere, and would open when the actual pressure is above set point, exhausting air.

The pressure controller senses the actual pressure, compares it with the set point, and sends out a signal (electrical or pneumatic) which varies from minimum to maximum based on the deviation between set and actual pressure. If actual is at the set point, the controller's output would be around the middle of its range. If actual is below set, output would be e.g., between 10 and 15 volts, (or 10–15 p.s.i. as the case may be) and if above set it would be e.g., 5 to 10 volts. This output signal is sent to two valves, each of which must respond in proportion to its input signal. The inlet valve would be closed below 10 volts and would open when the signal is greater than 10 volts, opening wider with higher voltage, and the exhaust valve would be closed above 10 volts and would open at less than 10 volts, opening wider with lower voltage. Obviously, such a system is somewhat complex because of the complexity of the valves and the necessity to co-ordinate them so there is no overlap or dead band.

Figure 1:
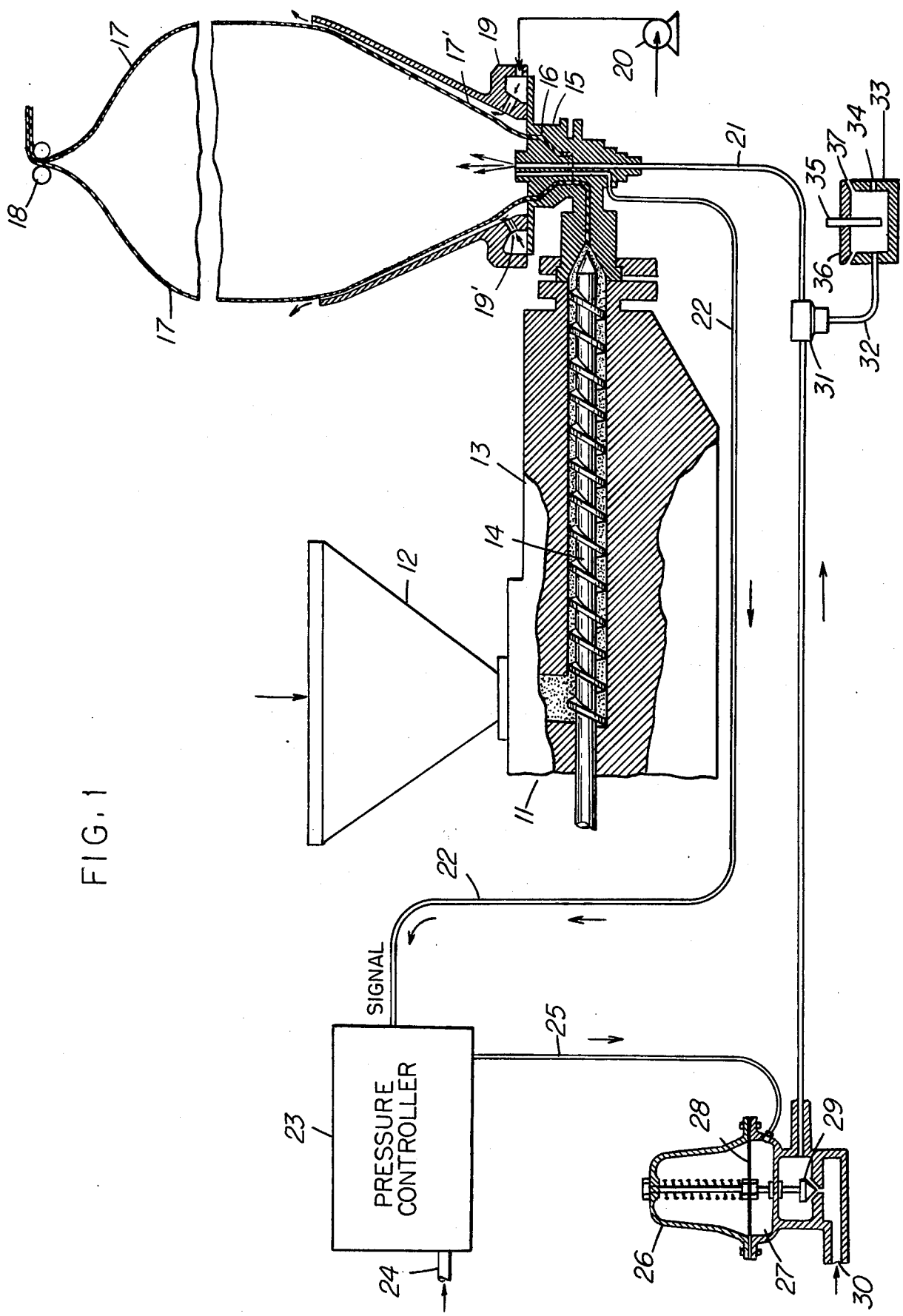
FIG. 1 is a schematic illustration of a fragmentary portion of an extruder and die for extruding a tubular film and a pressure control system for the extruded tube in accordance with the present invention.

As illustrated in FIG. 1, there is shown a fragmentary schematic representation, partially in cross-section, of a standard tubular extrusion system wherein thermoplastic resin is fed from feed hopper 12 into extruder 13. Screw element 14, as it rotates, advances and melts the resin as it progresses towards the end of the extruder, and the molten thermoplastic is extruded into die element 15 where it passes into annular orifice 16 and exits from the die in a form of a molten tube or bubble. The tube 17, upon emergence from die orifice 16, is immediately cooled and shaped by essentially cone-shaped, shape imposition assembly 19. Assembly 19 is supplied with air from pump 20 and the air impinges upon and cools extruded tube 17 as it passes through assembly 19 in close proximity thereto, but out of contact therewith. Extruded tube 17 is inflated by air line 21 carrying compressed air which air enters the tube, as shown in FIG. 1, through an inlet aperture located in the central portion of die 15. After tube 17 has been inflated to a desired diameter and cooled so that it is no longer in a semi-molten or tacky condition, it is collapsed by a pair of nip rollers (not shown) located downstream of tube 17 and passed on to further processing.

In accordance with the present invention, as shown in FIG. 1, air pressure inside tube 17 is continuously monitored by pressure sensor line 22. Pressure sensor line 22 continually feeds back a pneumatic signal to pressure controller 23. Pressure controller 23 may be any one of a number of commercially available pressure indicating and control devices. One such pressure control instrument, which has been found to be especially useful in the practice of the present invention, has been found to be an instrument identified as Pressure Controller AMETEK PIC07N supplied by AMETEK, Instruments and Controls. The Pressure Controller 23 is supplied with instrument supply air at about 20 psi through line 24. When the pressure controller 23 has been adjusted to a set point (corresponding to a desired internal bubble pressure) of, for example 0.2 inches of water, it is capable of sending a pneumatic output signal through output line 25, which signal may range from about 3 up to about 15 psi. For example, when the actual signal received through sensor line 22, which directly senses internal bubble pressure, is below the set point of 0.2 inches of water, this indicates that the pressure within the bubble 17 is below that which is desired. Accordingly, pressure controller unit 23 receiving such a signal will send a signal through output line 25 which is above 9 psi in an amount which is proportional to the amount below 0.2 inches of water which the sensor line fed to the pressure controller. This signal (i.e. pneumatic pressure above 9 psi) enters diaphragm valve 26, flows into chamber 27 and causes diaphragm 28 to expand, i.e. move upwardly. As shown in FIG. 1, this upward movement of diaphragm 28 opens needle valve 29 whereupon compressed air which enters diaphragm valve 26 through channel 20 now flows directly through pressure feed line 21 into bubble 17 until the desired internal bubble pressure is obtained whereupon diaphragm valve 26 assumes a closed or partially closed position again. Diaphragm valve 26 is closed by receiving a signal from pressure control output line 25. This signal, in turn, is generated by pressure sensor line 22, which, continuously monitoring the internal pressure of bubble 17, feeds back information in the form of a pneumatic signal to pressure controller 23, instructing it when a desired pressure which conforms to the set point of 0.2 inches of water exists within the bubble.

As illustrated in FIG. 1, poppet valve 33 is connected to air input line 21. The function of the poppet valve is to rapidly exhaust to the atmosphere, excess pressure which may be within bubble 17. Slight increases in pressure, above a desired set point are easily taken care of by poppet valve 33, as shown in FIG. 1. Such excess pressure may be bled from line 21 through line 32 and slowly bled from the system through bleed port 34 of the poppet valve. Additionally, when there is a sudden surge of pressure within bubble 17 which is above a set maximum, e.g. 1.0 inches of water, this is sensed immediately by poppet valve 33 through lines 21 and 32 and causes disc 36 to rise or float up vertical member 35 to permit a rapid exhaust of air to the atmosphere through circular channel 37 produced by the sudden elevation of disc 36.

Figure 2:
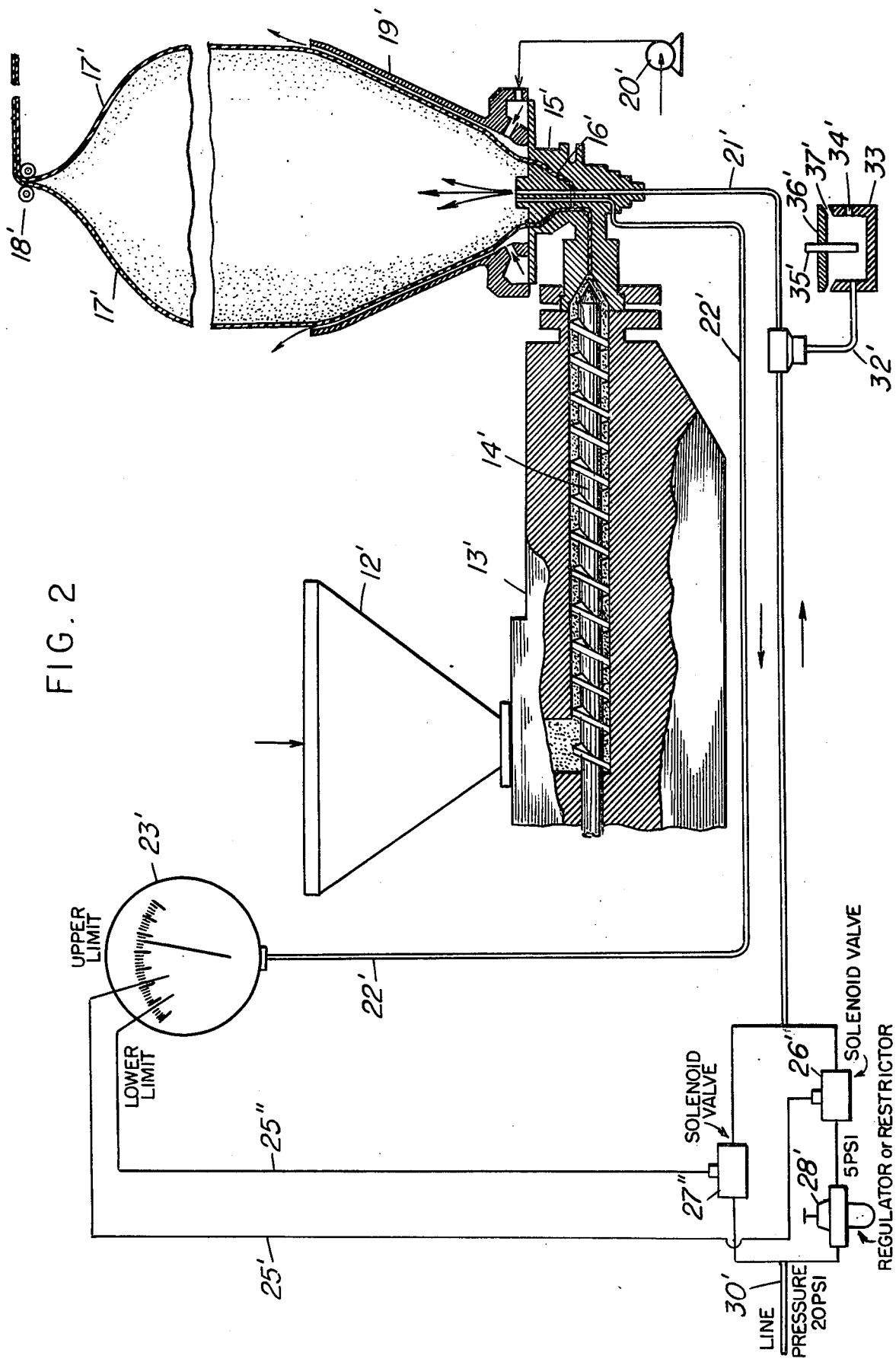
FIG. 2 is a schematic illustration of a fragmentary portion of an extruder and die system for extruding a tubular film similar to FIG. 1, and an alternate embodiment of a pressure control system which may be employed for controlling the internal air pressure of the extruded tube which forms another embodiment of the system illustrated in FIG. 1.

As illustrated in FIG. 2, there is shown an alternate system of pressure control for controlling internal bubble pressure in a tubular film extrusion process in accordance with the present invention. In FIG. 2 there is illustrated a fragmentary schematic representation, partially in cross-section, of a standard tubular system as shown in FIG. 1 wherein the thermoplastic resin is fed from feed hopper 12' into extruder 13'. Screw member 14', as it rotates, advances and melts the resin as it progresses toward the end of the extruder, and the molten thermoplastic is subsequently extruded into die element 15' where it passes through orifice 16' and exits from die 15' in the form of a molten tube or bubble. The tube 17', upon emergence from die orifice 16', is immediately cooled and shaped by essentially cone-shaped, shape imposition assembly 19'. Assembly 19' is supplied with air from pump 20' and the air, impinges upon, and cools tube 17' as it passes through assembly 19' in close proximity thereto but out of contact therewith. Extruded tube 17', is inflated by air line 21' carrying compressed air which enters the tube as shown in FIG. 2, through an inlet aperture located in the central portion of die 15'. After tube 17' has been inflated to a desired diameter and cooled so that it is no longer in a semimolten or tacky condition, it is collapsed by a pair of nip rollers 18' located downstream from tube 17' and passed on to further processing. In accordance with the alternate pressure control embodiment of the present invention, as shown in FIG. 2, air pressure inside tube 17' is continuously monitored by pressure sensor line 22' which is in direct communication with the interior of bubble 17'. Pressure sensor 22' continuously feeds back a pneumatic signal to pressure control means 23'. Although pressure controller 23' may be any one of a number of commercially available pressure indicating and control devices, a pressure control instrument, which has been found to be especially useful in the alternate embodiment of the present invention, has been found to be an instrument identified as a Photohelic Pressure Switch manufactured by Dyer Instrument, Inc., when employed in conjunction with a specific arrangement of valves, e.g. solenoid valves, and air flow restriction means hereinafter described.

In this embodiment of the pressure control system, which forms a part of the present invention, pressure control device 23', initially senses internal air pressure within bubble 17' through line 22'. The sensed pressed registers on the meter face of Photohelic Pressure Switch 23', utilizing conventional means whereby it is displayed on the meter face relative to two, manually-adjustable, preset points on the same scale identified in FIG. 2 as Upper Limit and Lower Limit. The Upper Limit on the face of the meter scale as shown in FIG. 2 is manually adjusted to define a pressure below which make-up air is to be added to tubular bubble 17' at a gradually controlled rate. It will be noted that when pressure within tube 17' falls below the Upper Limit set point and is sensed by control device 23', an electrical impulse passes through line 25' to valve 26', located downstream from a conventional regulator or restrictor valve 28' (which may be preferably of the flexible diaphragm type). While the pressure sensed within the bubble is above the Upper Limit set point, the valve 26' remains closed. However, when the bubble pressure falls below the Upper Limit set point the valve 26' opens, allowing line air pressure 30' to pass, at a controlled rate through regulator 28' and through valve 26' thereby feeding relatively low pressure, e.g. on the order of perhaps about 5 p.s.i., through valve 26', preferably a solenoid type valve, which air passes through line 21' and into thermoplastic tube 17' thereby adjusting internal bubble pressure above the defined upper limit on gauge 23'. In extrusion situations where the pressure within the bubble 17' falls below the Lower Limit set point as shown on the meter face of pressure regulator 23' and sensed through line 22', make-up air at a higher rate, which is necessary to prevent bubble collapse and restore stable operation, is added by actuation by the Lower Limit scale point on regulator 23' which sends an electrical impulse via line 25" to valve 27" opening valve 27" and thereby allowing make-up air from air pressure line 30' to pass unrestrictedly through valve 27" (heretofore closed) thus supplying, again through line 21', a greater amount of make-up air, and at a higher flow rate then that which could be supplied by regulated valve 26' to bubble 17'.

As hereinbefore described, with respect to the pressure relief system from bubble 17', poppet valve 33' is connected to air inlet 21'. The function of the poppet valve is to rapidly exhaust to the atmosphere, excess pressure which may be within bubble 17'. Slight increases in pressure, above a desired set point are easily taken care of by poppet valve 33', as shown in FIG. 2. Such excess pressure may be bled from line 21' through line 32' and slowly bled from the system through bleed port 34' of the poppet valve. Additionally, when there is a sudden surge of pressure within bubble 17' which is above a set maximum, e.g. 1.0 inches of water, this is sensed immediately by poppet valve 33' through lines 21' and 32' and causes disc 36' to rise or float up vertical member 35' to permit a rapid exhaust of air to the atmosphere through circular channel 37' produced by the sudden elevation of disc 36'.

In specific operation of the pressure control system as illustrated in FIG. 2, the normal operating range of internal bubble 17' pressure is above the Upper Limit set point of regulator 23'. For example when the preferred internal bubble pressure is at least 0.20 inch of water or slightly above, the Upper Limit set point is set at 0.20 inch of water pressure, and the Lower Limit set point may be set at 0.12 inch of water pressure. When actual internal pressure in tube 17', as sensed by line 22', is above 0.20 inch of water pressure, valves 26' and 27" remain closed. When the pressure drops below 0.20 inches, i.e. below the Upper Limit set point, valve 26' is opened and a restricted flow of air, i.e. below e.g. 20 p.s.i. as regulated by regulator 28', is added as make up air to build up internal bubble pressure, within a few seconds, to at least 0.20 inch of pressure or slightly above, as desired. Alternatively, when internal bubble pressure falls below the Lower Limit set point of, e.g. 0.12 inch of water as registered on regulator 23', valve 27" is now opened via signal through line 25", admitting line pressure air at a faster rate to avoid collapse of bubble 17'.

As hereinabove described, the present invention provides a reliable, inexpensive apparatus and method for controlling the internal air pressure within the confines of a tubular thermoplastic film, as it is being extruded. Without the air pressure control system of the present invention, it would be necessary to employ more complicated double-valve systems for air pressure control or attempt to control bubble air pressure manually. An example of the latter case would be to have an extrusion line operator puncture of the extruded thermoplastic bubble in order to allow a rapid exhaust of air, thereby preventing an undesirable rise in air pressure within a bubble which is contracting as a result of a process change. This is at best an unreliable technique, since if too large a puncture is made, air will exhaust too quickly and the resulting pressure inside the bubble may become so low that the bubble will collapse. Conversely, if the puncture is not large enough, the air pressure within a contracting bubble will continue to rise to the point where the bubble will completely rupture, causing a shut-down of the extrusion operation.

The foregoing description is illustrative of the various aspects of the present invention in detail. However, it should be recognized that it is only illustrative. Variations from what is disclosed will undoubtedly occur to those skilled in the art and it will nevertheless be embraced by the inventive concept of the present invention as defined in the following claims.

What is claimed is:

1. A method for controlling internal air pressure within a tubular thermoplastic film bubble which comprises initially inflating said bubble with air under pressure until a desired internal pressure is achieved, continuously sensing and monitoring said internal pressure by means of a pressure sensor device in communication with the interior of said bubble, said pressure sensor device continuously sending a signal to a pressure control device, and when said pressure falls below a preselected level actuating an air pressure input valve, said valve being in communication with said control device, a source of air under pressure and the interior of said bubble, whereby makeup air pressure is added to said bubble, and when said air pressure within said bubble is above a pre-selected level, said air pressure is immediately reduced through an exhaust valve in direct communication with said bubble, said exhaust valve being pressure-actuated; and said exhaust valve being responsive to small incremental pressure variations as well as sudden surges of high pressure.

* * * * *